Nov. 1, 1966        P. W. CHASE ETAL        3,282,417
     METHOD AND APPARATUS FOR CONTROLLING CLEANNESS OF
                  A HEAVY MEDIUM SUSPENSION
            Filed Nov. 13, 1962
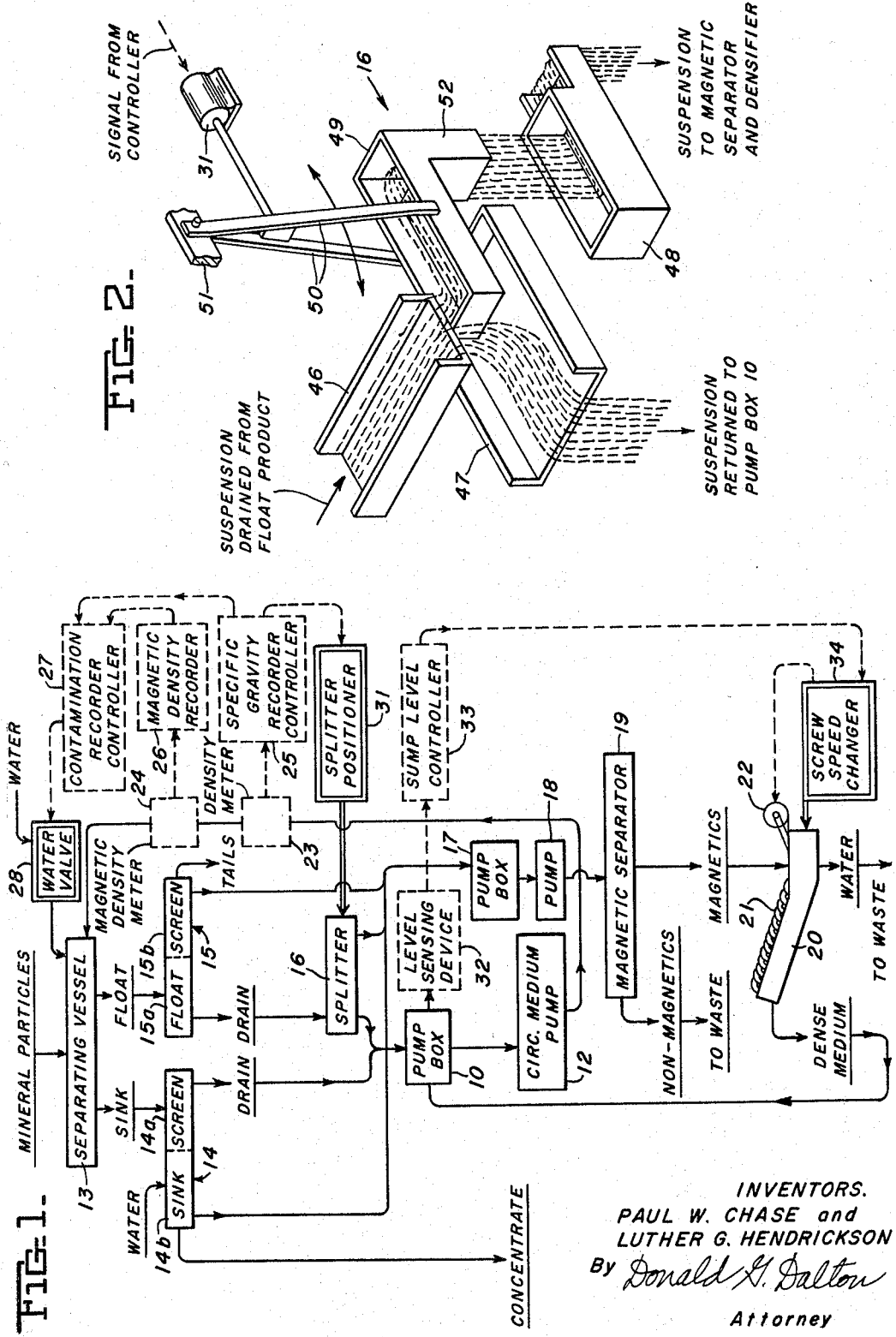
INVENTORS.
PAUL W. CHASE and
LUTHER G. HENDRICKSON
By Donald G. Dalton
        Attorney

United States Patent Office 3,282,417
Patented Nov. 1, 1966

3,282,417
METHOD AND APPARATUS FOR CONTROLLING CLEANNESS OF A HEAVY MEDIUM SUSPENSION
Paul W. Chase, Mountain Iron, and Luther G. Hendrickson, Duluth, Minn., assignors to United States Steel Corporation, a corporation of Delaware
Filed Nov. 13, 1962, Ser. No. 236,945
8 Claims. (Cl. 209—12)

This invention relates to a method and apparatus for controlling the cleanness of a medium used in a heavy medium minerals separation process.

In a conventional heavy medium process, mineral particles are introduced to a vessel which contains a medium of specific gravity intermediate that of the values and gangue in the mineral. Commonly the medium is a water suspension of a finely divided magnetic substance, such as ferrosilicon or magnetite. If the mineral is an ore, such as iron ore, the values sink while the gangue floats. The reverse occurs with some materials, such as coal. After the sink and float products leave the separating vessel, the suspension is drained therefrom and recovered for re-use. Next the sink and float products are washed. The wash water, along with a fraction of the suspension drained from the products, goes to a magnetic separator and thence to a densifier. The magnetic separator removes nonmagnetic contaminants and the densifier removes water to produce a densified medium of higher specific gravity than that used in the separating vessel. The densified medium joins the remainder of the drained suspension and returns to the separating vessel. Water accompanying the mineral particles dilutes the medium in the vessel to the proper specific gravity. Reference can be made to Wade Reissue Patent No. 22,191, dated September 29, 1942, for a detailed showing of a process of this type, although the specific pieces of equipment Wade shows are not of the most modern construction.

To achieve a maximum recovery of the values at the desired grade, the specific gravity and other characteristics of the medium in the separating vessel should be maintained as nearly constant as possible. Variations in the feed rate, water content of the feed, and densifying characteristics make it difficult to maintain constant conditions. In another application Serial No. 236,944, filed the same date as the present application, we have shown and claimed a method and apparatus for automatically controlling the specific gravity of the medium and maintaining it substantially constant. Another characteristic which we find desirable to control is the quantity of nonmagnetic contaminants in the circulating medium or the "cleanness" of the medium. Such contaminants are removed only from the wash water and the fraction of the drained suspension which is treated in the magnetic separator. Hence the larger the treated fraction, the larger the quantity of contaminants removed and the cleaner the medium. The viscosity of the medium varies with its cleanness.

An object of our invention is to provide a method and apparatus for automatically controlling the cleanness of the circulating medium in a heavy medium minerals separation process.

A further object is to provide a control method and apparatus of the foregoing type which operate in conjunction with a specific gravity control, whereby both the specific gravity and cleanness of the medium are controlled automatically.

A more specific object is to provide a method and apparatus for automatically controlling the cleanness of the circulating medium in which the extent of contamination is determined by measuring both the density and the quantity of magnetic particles in the medium, and the difference between these measurements is used to regulate addition of water to the medium to decrease the content of contaminants.

In the drawing:

FIGURE 1 is a schematic flowsheet of a heavy medium minerals separation plant equipped with our apparatus for controlling cleanness of the medium; and FIGURE 2 is a perspective view of a preferred form of splitter embodied in our apparatus.

FLOWSHEET

FIGURE 1 shows a flowsheet of a heavy medium plant which includes a pump box 10, a medium-circulating pump 12, a separating vessel 13, and sink and float screens 14 and 15. Pump 12 continuously feeds the medium, a water suspension of magnetic particles, from the pump box 10 to the separating vessel 13. Mineral particles (for example 1¼ x ¼ inch iron ore) also are introduced to this vessel. Heavier mineral particles sink in the medium and discharge from the separating vessel to the sink screen 14, while lighter mineral particles float and discharge to the float screen 15. Screens 14 and 15 have "drain" sections 14a and 15a and "wash" sections 14b and 15b over which the sink and float products pass in succession. Suspension drained from the sink product as it passes over the drain section 14a returns directly to the pump box 10. Suspension drained from the float product as it passes over the drain section 15a goes to an adjustable splitter 16, which routes variable fractions to the pump box 10 and to another pump box 17. Water is applied to both the sink and float products as they pass over the wash sections 14b and 15b to wash away additional medium. Wash water from both products goes to the pump box 17, from which a pump 18 delivers the contents to a magnetic separator 19 to remove nonmagnetic contaminants. The remaining magnetic particles and water go to a densifier 20, which removes water. Densified suspension from the densifier returns to the pump box 10. In the example of an ore, sink particles leaving screen 14 usually are a finshed concentrate product, while float particles leaving screen 15 and nonmagnetic contaminants from the magnetic separator 19 usually are a finished tailing product.

The individual pieces of apparatus other than our preferred splitter, as well as the portion of the flowsheet thus far described, are conventional and hence not described in greater detail. However, we point out that the densifier is of a type in which both the speed and depth of the rake can be changed to increase or decrease the quantity of densified suspension feeding therefrom. We have illustrated a densifier which has a rotating rake or screw 21 and a motor 22 for lowering or raising the screw. A densifier of this type, and also a suitable separating vessel and pumps, are available commercially from Western Machinery Co., San Francisco, California, and are described in a printed publication by the supplier entitled "Wemco Equipment for Heavy Media Separation," Bulletin No. H1–B12. Another example of a suitable densifier is a reciprocating rake type of classifier available commercially from Dorr-Oliver Incorporated, Stamford, Connecticut, and is described in a printed publication by the supplier, Bulletin 2281. We also point out that the plant may include other conventional pieces of apparatus, such as demagnetizing coils for the recovered suspension, which we have not shown, since they are not involved in the present invention.

CLEANNESS CONTROL

In accordance with our invention, we mount both a density meter 23 and a magnetic density meter 24 at a convenient place in the flowsheet, illustrated in the line which carries medium from pump 12 to the separating vessel 13. The specific gravity of the medium carried in this line is a little higher than that of the medium actually in the vessel and the content of contaminants a little lower, but both may be considered representative for control purposes. We connect a recorder-controller 25 to meter 23 to record the specific gravity of the medium. The specific gravity is of course proportional to the total solids content (magnetic particles plus nonmagnetic contaminants). We connect another recorder 26 to meter 24 to record the content of magnetic solids in the medium. Recorders 25 and 26 transmit signals representative of the total solids content and the magnetic solids content respectively to a contamination recorder-controller 27. The last named recorder develops a signal representative of the difference between the total solids and the magnetic solids, which signal is representative of the content of contaminants in the medium or its "cleanness." We introduce water to the medium in the separating vessel 13 through an adjustable valve 28. The recorder-controller 27 automatically adjusts valve 28 to vary the volume of water in accordance with the content of contaminants to maintain the content at a relatively constant set value; that is, the more contaminants, the more water we introduce.

SPECIFIC GRAVITY CONTROL

A change in the volume of water introduced through valve 28 not only corrects the content of contaminants in the medium, but also changes the specific gravity from its set value. Therefore we use our cleanness control in conjunction with an automatic control for the specific gravity, preferably similar to one of those shown in our aforementioned application Serial No. 236,944 or in another application Serial No. 236,946 filed the same date by the co-inventor Chase jointly with Albert T. Koenen. We have illustrated a specific gravity control as shown in FIGURE 1 of the former application. The recorder-controller 25 transmits a signal representative of the density of the medium in vessel 13 to a splitter-positioner 31, which is mechanically connected to the splitter 16. The positioner 31 adjusts the splitter to vary the fraction of the drained suspension treated in the magnetic separator 19 and densifier 20 inversely with changes in specific gravity. If the specific gravity of the medium goes down from its set value, the positioner adjusts the splitter to route a larger fraction of the drained suspension through the magnetic separator and densifier, whereupon larger quantities of nonmagnetic contaminants and water are removed from the circulating suspension and its specific gravity thus raised. The reverse action occurs if the specific gravity of the medium goes up from its set value.

After an adjustment is made in the splitter position, there would normally be a time lag of several minutes before medium of corrected specific gravity reaches the separating vessel 13, but there is an immediate change in the level of medium in the pump box 10. If a larger fraction of the float drain product goes to the magnetic separator 19 and densifier 20, less of course returns directly to the pump box and the level falls. The reverse action occurs if a smaller fraction goes to the magnetic separator. We connect a level-sensing device 32 to the pump box and connect a controller 33 to the level-sensing device. Controller 33 transmits a signal representative of the level of medium in the pump box to a speed-changing device 34 for the motor which drives the densifier screw 21. When the level falls or rises from its set value, the screw immediately commences to turn faster or more slowly. As a result, particles actually in transit within the screw feed faster or more slowly to the pump box, and the specific gravity of the medium in the pump box is corrected promptly. The speed change itself produces only a temporary change in the feed rate. After the screw has fed all the medium particles actually in transit at the moment of the speed change, the speed change ceases to be a factor, but by this time the change caused by adjustment of the splitter takes effect. Hence medium in the pump box continues to be of the corrected specific gravity.

The cleanness control and the specific gravity control complement each other. For example, if the medium becomes more contaminated, the recorder-controller adjusts valve 28 to increase the volume of water introduced to vessel 13, thus lowering the specific gravity. The recorder-controller 25 adjusts the splitter 16 to route a larger fraction of the float drain product to the magnetic separator 19 and densifier 20. The magnetic separator removes an increased quantity of contaminants from the circuit, while the densifier removes more water. If the circuit is properly adjusted, it stabilizes at set values for both the contaminants and specific gravity.

As the plant operates, medium particles gradually are depleted. Hence the trend is for splitter 16 to route a larger and larger fraction of the drained suspension to the magnetic separator 19 and densifier 20 and for the densifier screw to run faster and faster. Preferably we connect the screw speed-changing device 34 with the raise-lower motor 22. When the speed of the densifier screw approaches a set maximum or minimum, a signal for a further increase or decrease in speed automatically operates motor 22 to lower or raise the screw. Our aforementioned application Serial No. 236,944 shows in detail one form of electric circuit we can employ for this purpose. Since this feature is not essential to the cleanness control claimed in the present application, we have not repeated this showing.

SPLITTER

FIGURE 2 shows structural details of our preferred form of splitter 16. A first fixed launder 46 receives suspension drained from the float product on screen 15. A second fixed launder 47 is located beneath launder 46 to receive the fraction of the suspension which returns directly to the pump box 10. A third fixed launder 48 is located beneath launder 46 and offset therefrom to receive the fraction which goes to the magnetic separator 19 and densifier 20. The splitter includes a swinging launder 49 and a pair of links 50 attached to this launder and pivoted to an overhead support 51. The swinging launder is located in the space between the fixed launders 46 and 47 and it has an outlet spout 52 in its end above the fixed launder 48. The positioner 31 is connected to the links 50 to move the swinging launder back and forth in response to signals from the recorder-controller 25. The splitter construction per se is claimed in another application filed by the co-inventor Hendrickson, Serial No. 361,498, filed April 21, 1964, now Patent No. 3,207,173, which is a division of application Serial No. 208,757, filed July 10, 1962, and now Patent No. 3,235,079.

INSTRUMENTS

The individual instruments used in our control apparatus are of conventional construction and available commercially. Hence we have not shown nor described them in detail, but instead reference can be made to printed publications for showings.

Considine, "Process Instruments and Controls Handbook," published by McGraw-Hill Book Company, copyright 1957, Library of Congress Catalog Card No. 56–8169, shows and describes instruments suitable for several for our purposes. Considine shows a recorder-controller (pages 11–22 or 11–26) suitable for our recorder-controllers 25 and 27 and recorder 26, a cylinder-type operator with positioner (pages 10–27) suitable for our splitter-positioner 31, and a motor operated valve (pages 10–51) suitable for our valve 28. Suitable recorder-controllers also are available commercially from Leeds and Northrup Company, Philadelphia, Pa. as "Type H." We use a "Type H" recorder alone for our recorder 26. We add a "CAT" controller for our recorder-controller 25, and a "PAT" controller for our recorder-controller 27. These instruments are described in printed publications by the supplier, Data Sheets "ND46–33(106)80–558" and "ND46–51(100)60–658" and Folder "ND4(7b)80–1158" pages 5 and 6 "PAT," pages 9 and 10 "CAT." We equip recorders 25 and 26 with retransmitting slide wires. A suitable positioner 31 also is available commercially from Foxboro Company, Foxboro, Mass. as the "Stabiload" and is described in a printed publication by the supplier, Bulletin No. 446. A suitable motor for valve 28 is available commercially from Minneapolis-Honeywell Regulator Co., Minneapolis, Minn. as the "Actionator M–930B" and is described in a printed publication by the supplier Form No. 95–2624.

Our density meter 23 can be an Ohmart cell as shown in Ohmart Patent No. 2,763,790 or a gamma gage. A suitable magnetic density meter 24 is available commercially from Ramsey Engineering Co., St. Paul, Minn., as the "Model PC–6 Ramsey Pipe Coil" used in conjunction with a "Ramsey Converter." The pipe coil gives an A.-C. voltage signal proportional to the content of magnetic solids, and the converter changes this signal to a D.-C. voltage signal to operate the recorder. A suitable level-sensing device 32 and level controller 33 are available commercially from Fisher Governor Co., Marshalltown, Iowa, as "Type 249P" and "Type 2500 Fisher Level-Trol" and are described in a printed publication by the supplier, Bulletin F-4A. A suitable screw speed changer 34 is available commercially from Louis Allis Co., Milwaukee, Wis., as the "Select-a-spede" drive and is described in a printed publication by the supplied, Service manual, Section 14A, July 1, 1957.

Our illustrative recorder-controller 25 generates an electric signal. When we use this signal to control a pneumatically operated positioner 31, we include an electric-to-pneumatic transducer. A suitable transducer for this purpose is available commercially from Fisher Governor Co. as "Type 543" and is described in a printed publication by the supplier, Bulletin E543. Our illustrative level controller 33 generates a pneumatic signal. When we use this signal to control the speed of the densifier motor, we include a pneumatic-to-electric transducer. A suitable transducer for the latter purpose is available commercially from Taylor Instrument Companies, as the "Transcope Servomatic Transducer" and is described in a printed publication by the supplier, Bulletin 98375, May 1960.

From the foregoing description, it is seen our invention affords a relatively simple yet effective method and apparatus for controlling the content of non-magnetic contaminants in the medium used in a heavy medium minerals separation process. Used in conjunction with a specific gravity control, our invention automatically holds both the specific gravity and the cleanness of the medium at relatively constant values.

While we have shown and described only a single embodiment of the invention, it is apparent that modifications may arise. Therefore, we do not wish to be limited to the disclosure set forth but only by the scope of the appended claims.

We claim:

1. In a heavy medium minerals separation process in which mineral particles are introduced to a water suspension of magnetic particles, heavier mineral particles sink in the suspension while lighter mineral particles float, the resulting sink and float products are successively drained of suspension and washed with water, both the wash water and a variable fraction of the drained suspension are treated to remove nonmagnetic contaminants and water and thereby produce a densified suspension, said densified suspension together with the remainder of the drained suspension is transferred to a pump box, and the suspension feeds from the pump box to a vessel where the mineral particles are introduced, the combination therewith of a method of controlling the cleanness of the suspension within said vessel comprising determining the content of nonmagnetic contaminants in the suspension at a location representative of the vessel, introducing a variable volume of water to said vessel to maintain a relatively constant set content of contaminants in the suspension within said vessel, and adjusting the content of magnetic particles in the suspension entering said vessel after the water volume changes, thereby compensating for changes in the specific gravity of the suspension brought about by variations in the water volume and maintaining the specific gravity of the suspension within said vessel at a relatively constant set value.

2. In a heavy medium minerals separation process in suspension is transferred to a pump box, and the suspension of magnetic particles, heavier mineral particles sink in the suspension while lighter mineral particles float, the resulting sink and float products are successively drained of suspension and washed with water, both the wash water and a variable fraction of the drained suspension are treated to remove nonmagnetic contaminants and water and thereby produce a densified suspension, said densified suspension together with the remainder of the drained suspension is transferred to a pump box, and the suspension feeds from the pump box to a vessel where the mineral particles are introduced, the combination therewith of a method of controlling the cleanness of the suspension within said vessel comprising measuring both the specific gravity of the suspension and the content of magnetic particles therein at a location representative of the vessel, developing a signal proportional to the difference between the specific gravity and the content of magnetic particles, which signal is representative of the content of contaminants, introducing water to said vessel in volumes which vary with said signal to maintain a relatively constant set content of contaminants in the suspension within said vessel, and adjusting the content of magnetic particles in the suspension entering said vessel after the water volume changes, thereby compensating for changes in the specific gravity of the suspension brought about by variations in the water volume and maintaining the specific gravity of the suspension within said vessel at a relatively constant set value.

3. In a heavy medium minerals separation process in which mineral particles are introduced to a water suspension of magnetic particles, heavier mineral particles sink in the suspension while lighter mineral particles float, the resulting sink and float products are successively drained of suspension and washed with water, both the wash water and a variable fraction of the drained suspension are treated to remove nonmagnetic contaminants and water and thereby produce a densified suspension, said densified suspension together with the remainder of the drained suspension is transferred to a pump box, and the suspension feeds from the pump box to a vessel where the mineral particles are introduced, the combination therewith of a method of controlling the cleanness of the suspension within said vessel comprising measuring both the specific gravity of the suspension and the content of magnetic particles therein at a location representative of the vessel, developing a signal proportional to the difference between the specific gravity and the content of magnetic particles, which signal is representative of the content of contaminants, introducing water to said vessel in volumes which vary with said signal to maintain a relatively constant set content of contaminants in the suspension within said vessel, and adjusting both the magnitude of the treated fraction of the drained suspension and the rate at which said densified suspension is transferred to the pump box in response to changes in the specific gravity measurement caused by changes in the volume of water to compensate for the change and maintain the specific gravity of the suspension within said vessel at a relatively constant set value.

4. In a fluid circuit which handles a water suspension of magnetic particles an apparatus for controlling the cleanness of the suspension comprising means for developing a signal representative of the content of nonmagnetic contaminants in the suspension, means operatively connected with said signal-developing means for introducing a variable volume of water to said circuit to maintain a relatively constant set content of contaminants therein, and separate means for adjusting the content of magnetic particles in the suspension after the water volume changes, thereby compensating for changes in the specific gravity of the suspension brought about by variations in the water volume and maintaining the specific gravity at a relatively constant set value.

5. In a fluid circuit which handles a water suspension of magnetic particles, an apparatus for controlling the cleanness of the suspension comprising means for measuring both the specific gravity of the suspension and the content of magnetic particles therein, means operatively connected with said measuring means for developing a signal proportional to the difference between the measurements which signal is representative of the content of contaminants, means operatively connected with said signal-developing means for introducing water to the circuit in volumes which vary with the signal to maintain a relatively constant set content of contaminants, and separate means operatively connected with said measuring means for adjusting the content of magnetic particles in the suspension after the water volume changes, thereby compensating for changes in the specific gravity of the ssuspension brought about by variations in the water volume and maintaining the specific gravity at a relatively constant set value.

6. In a heavy medium minerals separation plant, which includes a separating vessel adapted to contain a water suspension of magnetic particles in which heavier mineral particles sink while lighter mineral particles float, means for recovering suspension from the sink and float products from said vessel, means for treating a portion of the recovered suspension to remove non-magnetic contaminants and water, and means for recirculating said recovered suspension to said vessel, the combination therewith of an apparatus for controlling the cleanness of the suspension within said vessel comprising means for developing a signal representative of the content of nonmagnetic contaminants in the suspension recirculating to said vessel, means operatively connected with said signal-developing means for introducing a variable volume of water to said vessel to maintain a relatively constant set content of contaminants in the suspension within said vessel, and means for adjusting the content of magnetic particles in the suspension entering said vessel after the water volume changes, thereby compensating for changes in the specific gravity of the suspension brought about by variations in the water volume and maintaining the specific gravity of the suspension within said vessel at a relatively constant set value.

7. In a heavy medium minerals separation plant, which includes a separating vessel adapted to contain a water suspension of magnetic particles in which heavier mineral particles sink while lighter mineral particles float, means for recovering suspension from the sink and float products from said vessel, means for treating a portion of the recovered suspension to remove non-magnetic contaminants and water, and means for recirculating said recovered suspension to said vessel, the combination therewith of an apparatus for controlling the cleanness of the suspension within said vessel comprising means for measuring both the specific gravity of the suspension recirculating to said vessel and the content of magnetic particles therein, means operatively connected with said measuring means for developing a signal proportional to the difference between the specific gravity and the content of magnetic particles, which signal is representative of the content of contaminants, means operatively connected with said signal-developing means for introducing water to said vessel in volumes which vary with the signal to maintain a relatively constant set content of contaminants in the suspension within said vessel, and means operatively connected with said measuring means for adjusting the content of magnetic particles in the suspension entering said vessel after the water volume changes, thereby compensating for changes in the specific gravity of the suspension brought about by variations in the water volume and maintaining the specific gravity of the suspension within said vessel at a relatively constant set value.

8. In a heavy medium minerals separation plant, which includes a separating vessel adapted to contain a water suspension of magnetic particles in which heavier mineral particles sink while lighter mineral particles float, means for successively draining the suspension from sink and float products from said vessel and washing the products with water, means for treating both the wash water and a variable fraction of the drained suspension to remove nonmagnetic contaminants and water and thereby producing a densified suspension, a pump box to which are transferred said densified suspension from said treating means and the remainder of the drained suspension, and a pump for feeding ssuspension from said pump box to said vessel, the combination therewith of an apparatus for controlling the cleanness of the suspension within said vessel comprising means for measuring both the specific gravity of the suspension feeding to said vessel and the content of magnetic particles therein, means operatively connected with said measuring means for developing a signal proportion to the difference between the specific gravity and the content of magnetic particles, which signal is representative of the content of contaminants, means operatively connected with said signal-developing means for introducing water to said vessel in volumes which vary with the signal to maintain a relatively constant set content of contaminants in the suspension within said vessel, and means operatively connected with said measuring means for adjusting both the magnitude of the treated fraction of the drained suspension and the rate at which said densified suspension is transferred to said pump box to compensate for changes in the specific gravity measurement caused by changes in the volume of water, whereby the specific gravity of the suspension within said vessel is maintained at a relatively constant set value.

References Cited by the Examiner

UNITED STATES PATENTS

| | | | |
|---|---|---|---|
| 2,760,769 | 8/1956 | Onstad | 324—34 |
| 2,965,316 | 12/1960 | Henderson | 241—34 |
| 3,093,577 | 6/1963 | Wilmot | 209—172.5 |
| 3,235,072 | 2/1966 | Nelson | 209—172.5 X |

OTHER REFERENCES

Oss et al., Mining Eng., vol. 14, No. 5, pages 41–45, May 1962.

HARRY B. THORNTON, *Primary Examiner.*

FRANK W. LUTTER, HERBERT L. MARTIN,
*Examiners.*

R. HALPER, *Assistant Examiner.*

UNITED STATES PATENT OFFICE
CERTIFICATE OF CORRECTION

Patent No. 3,282,417　　　　　　　　　　　　　　　　November 1, 1966

Paul W. Chase et al.

It is hereby certified that error appears in the above numbered patent requiring correction and that the said Letters Patent should read as corrected below.

Column 4, line 62, for "for" read -- of --; column 5, line 27, for "supplied" read -- supplier --; column 6, line 10, for "suspension is transferred to a pump box, and the" read -- whic mineral particles are introduced to a water --; line 71, after "particles" insert a comma; column 7, line 16, after "measurements" insert a comma; column 8, line 34, for "proportion" read -- proportional --.

Signed and sealed this 5th day of September 1967.

(SEAL)
Attest:

ERNEST W. SWIDER
Attesting Officer

EDWARD J. BRENNER
Commissioner of Patents